(12) United States Patent
Totir et al.

(10) Patent No.: US 7,459,237 B2
(45) Date of Patent: Dec. 2, 2008

(54) NON-AQUEOUS LITHIUM ELECTRICAL CELL

(75) Inventors: Dana Alexa Totir, Danbury, CT (US); Kirakodu S. Nanjundaswamy, Sharon, MA (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 569 days.

(21) Appl. No.: 10/800,905

(22) Filed: Mar. 15, 2004

(65) Prior Publication Data

US 2005/0202320 A1    Sep. 15, 2005

(51) Int. Cl.
*H01M 4/50* (2006.01)
*H01M 6/16* (2006.01)

(52) U.S. Cl. .............. 429/224; 429/231.95; 429/324; 429/245

(58) Field of Classification Search .......... 429/224, 429/231.95, 231.1, 321, 322, 324, 245; 568/6; 423/277
See application file for complete search history.

(56) References Cited

U.S. PATENT DOCUMENTS

| | | | |
|---|---|---|---|
| 345,124 A | 7/1886 | DeVirloy | |
| 4,279,972 A | 7/1981 | Moses | |
| 4,401,735 A | 8/1983 | Moses et al. | |
| 4,526,846 A | 7/1985 | Kearney et al. | |
| 5,595,841 A | 1/1997 | Suzuki | |
| 5,691,081 A * | 11/1997 | Krause et al. ............ | 429/307 |
| 5,886,196 A * | 3/1999 | Furbringer ............... | 549/213 |
| 6,506,516 B1 * | 1/2003 | Wietelmann et al. ...... | 429/188 |
| 7,172,834 B1 * | 2/2007 | Jow et al. ................ | 429/188 |
| 7,285,356 B2 | 10/2007 | Issaev et al. | |
| 2001/0033964 A1 | 10/2001 | Heider et al. | |
| 2002/0114993 A1 * | 8/2002 | Miyaki et al. ............ | 429/137 |
| 2003/0113637 A1 * | 6/2003 | Birke-Salam et al. ..... | 429/341 |
| 2004/0053138 A1 * | 3/2004 | Otterstedt et al. ........ | 429/307 |
| 2005/0019670 A1 * | 1/2005 | Amine et al. ............. | 429/326 |
| 2005/0191545 A1 * | 9/2005 | Bowles et al. ............ | 429/127 |
| 2006/0216597 A1 * | 9/2006 | Boczer et al. ............ | 429/217 |

FOREIGN PATENT DOCUMENTS

| | | |
|---|---|---|
| CA | 2336323 | 6/1999 |
| DE | 100 49 087 A1 | 4/2002 |
| DE | 10049097 * | 4/2002 |
| WO | WO00/55935 | 9/2000 |

OTHER PUBLICATIONS

Falk, S.U., *Alkaline Storage Batteries*, John Wiley & Sons, Inc. (New York, NY), 1969, pp. 1-41.

Wang, X. et al., "Inhibition of Anodic Corrosion of Aluminum Cathode Current Collector on Recharging in Lithium Imide Electrolytes", *Electrochimica Acta* 45 (2000) 2677-2684.

(Continued)

*Primary Examiner*—Raymond Alejandro
(74) *Attorney, Agent, or Firm*—Fish & Richardson P.C.

(57) ABSTRACT

An electrochemical cell includes a cathode containing $MnO_2$ and an anode including lithium. The cell also includes an electrolyte containing a bis(oxalato)borate salt. The cell further includes an aluminum surface in electrical contact with a non-aluminum metal surface.

19 Claims, 6 Drawing Sheets

OTHER PUBLICATIONS

"Lithium-bis(oxalate)borate: A Halogen-Free Conducting Salt for Lithium Batteries", Version 2.0/Mar. 2001 (11 pages).

Xu, W. et al., "LiBOB and Its Derivatives: Weakly Coordinating Anions, and the Exceptional Conductivity of Their Nonaqueous Solutions", *Electrochemical and Solid-State Letters*, 4 (1) E1-E4 (2001).

Xu, K. et al., "LiBOB as Salt for Lithium-Ion Batteries: A Possible Solution for High Temperature Operation", *Electrochemical and Solid-State Letters*, 5 (1) A26-A29 (2002).

Xu, K. et al., "Lithium Bis(oxalate)borate Stabilizes Graphite Anode in Propylene Carbonate", *Electrochemical and Solid-State Letters*, 5 (11) A259-A262 (2002).

* cited by examiner

NON-AQUEOUS LITHIUM ELECTRICAL CELL

TECHNICAL FIELD

The invention relates to non-aqueous electrochemical cells.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

In one aspect, the invention features an electrochemical cell including a cathode containing $MnO_2$, an anode containing lithium, and an electrolyte containing a bis(oxalato)borate salt. The cell includes an aluminum surface in electrical contact with a second metal surface that is different from the aluminum surface.

In certain embodiments, the cell includes a metal as a construction material. For example, the metal can be used to construct a cell container (or can), or a current collector for the positive electrode. Sometimes, the metal can corrode because the electrode potential of the metal is lower than the normal operating potential of the positive electrode of the cell. When the metal is coupled with different metals in the environment of an electrochemical cell, the metal can also be susceptible to corrosion. Corrosion can increase the internal impedance of a cell, leading to capacity loss and to a decrease in specific energy. Corrosion can also limit the choice of metals available as a construction material.

The bis(oxalato)borate salt additive can help to suppress corrosion of metal (e.g., aluminum) parts that contact the electrolyte of the cell.

In another aspect, the invention features a primary electrochemical cell having a cathode containing an aluminum current collector, an anode, and an electrolyte containing a bis(oxalato)borate salt. The electrolyte also includes a second salt that is a lithium salt.

In another aspect, the invention features an electrochemical cell having a cathode containing $MnO_2$, an anode containing lithium, an aluminum surface, and an electrolyte containing a bis(oxalato)borate salt at a concentration that is equal to or less than about 0.2 M.

In another aspect, the invention features a primary electrochemical cell having a cathode containing $MnO_2$, an anode containing lithium, and an electrolyte containing a bis(oxalato)borate salt. The cell includes an aluminum surface in contact with a second metal surface that is different from the aluminum surface.

In another aspect, the invention features a primary electrochemical cell having a cathode containing $MnO_2$, an anode containing lithium, and an electrolyte containing a bis(oxalato)borate salt. The cell includes two pieces of aluminum that are in electrical contact with each other.

In another aspect, the invention features a primary electrochemical cell having a cathode containing $MnO_2$, an anode containing lithium, and an electrolyte containing a bis(oxalato)borate salt at a concentration that is equal to or less than about 0.2 M.

In another aspect, the invention features an electrochemical cell having a cathode containing $MnO_2$, an anode containing lithium, and an electrolyte containing a bis(oxalato)borate salt at a concentration of less than about 0.2 M.

In another aspect, the invention features a method of inhibiting aluminum corrosion in a primary electrochemical cell. The method includes adding a bis(oxalato)borate salt to an electrolyte and placing the electrolyte, an anode containing lithium, and a cathode containing an aluminum current collector into a cell case to form the cell.

Aspects of the invention may include one or more of the following features.

In some embodiments, the cell is a primary electrochemical cell. In other embodiments, the cell is a secondary electrochemical cell.

The bis(oxalato)borate salt can be an ammonium salt (e.g., tetraethylammonium-bis(oxalato)borate, butylammonium-bis(oxalato)borate), lithium-bis(oxalato)borate, potassium-bis(oxalato)borate, or sodium-bis(oxalato)borate. In some embodiments, the electrolyte can contain the bis(oxalato)borate salt at a concentration that is equal to or less than about 0.2 M (e.g., less than about 0.15 M, less than about 0.1 M, less than about 0.05 M, less than about 0.025 M). In certain embodiments, the electrolyte can contain a second salt (e.g., a lithium salt, such as lithium trifluoromethanesulfonate (LiTFS), lithium trifluoromethanesulfonimide (LiTFSI), or a combination thereof). The electrolyte can contain a third salt (e.g., a lithium salt). In some embodiments, the electrolyte can contain a fourth salt (e.g., a lithium salt).

The aluminum surface can be a portion of an object having at least one dimension greater than 0.5 millimeter (e.g., greater than one millimeter, greater than two millimeters). The cell can have a case that includes aluminum. The case can be essentially of aluminum. The second metal surface that is in electrical contact with the aluminum surface can be a steel surface, an aluminum or aluminum alloy surface, or a nickel surface. In some embodiments, the cell can include a cathode current collector made of aluminum.

The cathode can include at least one of the following: $MnO_2$, $V_2O_5$, $CoF_3$, $MoS_2$, $FeS_2$, $SOCl_2$, $MoO_3$, sulfur, $(C_6H_5N)_n$ (where n is at least two), $(S_3N_2)_n$ (where n is at least two), or a fluorocarbon. The anode can include lithium.

In some embodiments, the method further includes adding a second salt (e.g., a lithium salt) to the electrolyte. The method can include adding a third salt (e.g., a lithium salt) to the electrolyte and in some embodiments, the method includes adding a fourth salt (e.g., a lithium salt) to the electrolyte.

Other aspects, features, and advantages are in the description, drawings, and claims.

DETAILED DESCRIPTION

Figure 1:
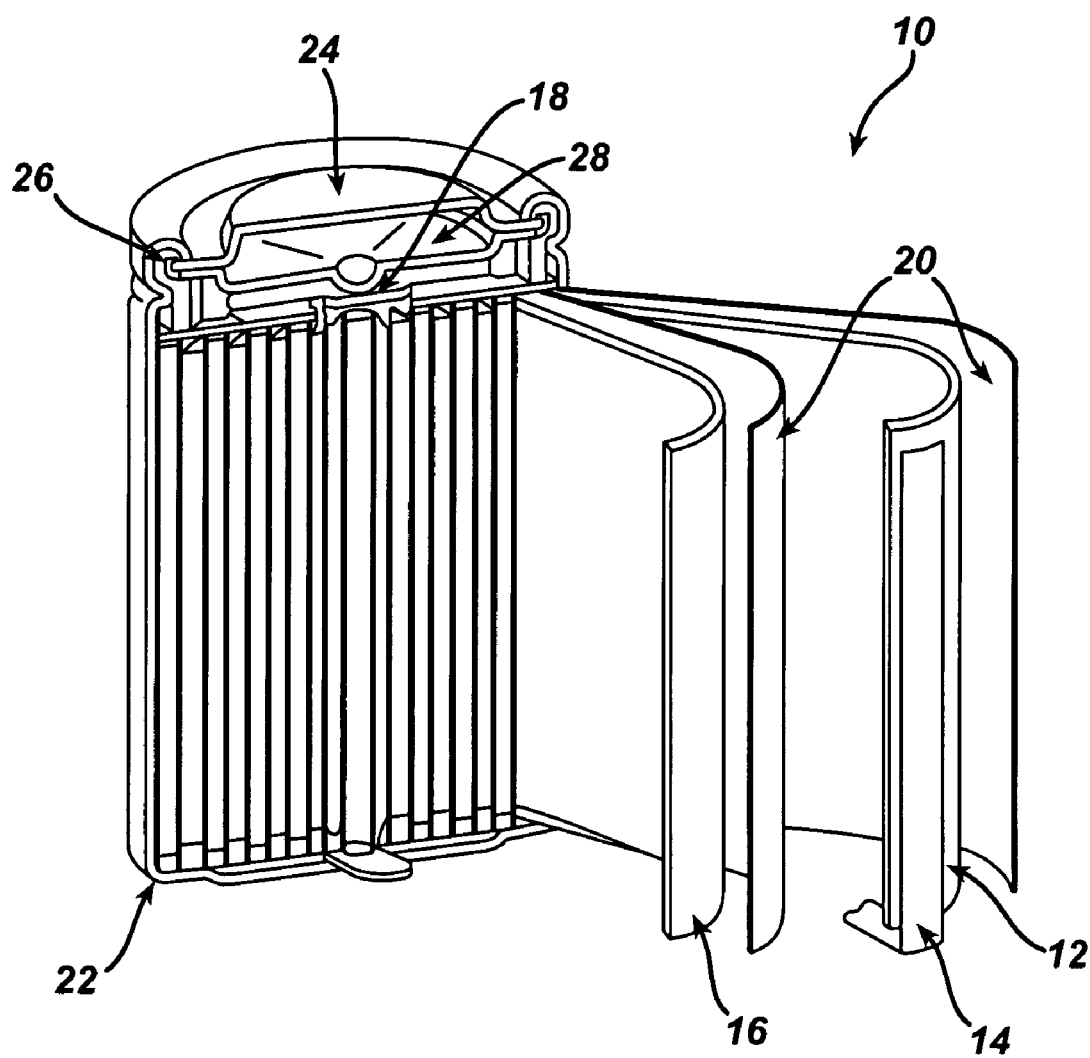
FIG. 1 is a sectional view of a nonaqueous electrochemical cell.

Referring to FIG. 1, an electrochemical cell 10 includes an anode 12 in electrical contact with a negative lead 14, a cathode 16 in electrical contact with a positive lead 18, a separator 20 and an electrolytic solution. Anode 12, cathode 16, separator 20 and the electrolytic solution are contained within a case 22. The electrolytic solution includes a solvent system and a salt that is at least partially dissolved in the solvent system. Electrochemical cell 10 further includes a cap 24 and an annular insulating gasket 26, as well as a safety valve 28.

The electrolytic solution or electrolyte can be in liquid, solid or gel (polymer) form. The electrolyte can contain an organic solvent such as propylene carbonate (PC), ethylene carbonate (EC), dimethoxyethane (DME), butylene carbonate (BC), dioxolane (DO), tetrahydrofuran (THF), acetonitrile ($CH_3CN$), gamma-butyrolactone, diethyl carbonate (DEC), dimethyl carbonate (DMC), ethyl methyl carbonate (EMC), dimethylsulfoxide (DMSO), methyl acetate (MA), methyl formiate (MF), sulfolane, or combinations thereof. The electrolyte can alternatively contain an inorganic solvent such as $SO_2$ or $SOCl_2$. The electrolyte also can contain a lithium salt, such as lithium trifluoromethanesulfonate (LiTFS) or lithium trifluoromethanesulfonimide (LiTFSI), or a combination thereof. Additional lithium salts that can be included are listed in U.S. Pat. No. 5,595,841, which is hereby incorporated by reference in its entirety. In some embodiments, the electrolyte may contain $LiPF_6$; in other embodiments, the electrolyte is essentially free of $LiPF_6$.

In preferred embodiments, the electrolyte also contains a bis(oxalato)borate salt, which inhibits corrosion in the cell. Examples of bis(oxalato)borate salts include lithium-bis(oxalato)borate (LiBOB), sodium-bis(oxalato)borate, potassium-bis(oxalato)borate, and ammonium salts such as tetraethylammonium-bis(oxalato)borate and butylammonium-bis(oxalato)borate. The bis(oxalato)borate salt can be included in the electrolyte at concentrations of, for example, from about 0.01 M to about 0.2 M.

In some embodiments, the electrolyte can include the bis(oxalato)borate salt at a concentration that is equal to or greater than about 0.005 M (e.g., greater than about 0.01 M, greater than about 0.025 M, greater than about 0.05 M, greater than about 0.075 M, greater than about 0.1 M, greater than about 0.125 M, greater than about 0.15 M, greater than about 0.175 M). Alternatively or in addition, the electrolyte can include the bis(oxalato)borate salt at a concentration that is equal to or less than about 0.2 M (e.g., less than about 0.175 M, less than about 0.15 M, less than about 0.125 M, less than about 0.1 M, less than about 0.075 M, less than about 0.05 M, less than about 0.025 M, less than about 0.01 M, less than about 0.005 M). An effective amount of bis(oxalato)borate salt to reduce, e.g., inhibit, corrosion to a desired level in the cell can be determined experimentally, e.g., using cyclic voltammetry.

The electrolyte can include only one salt (i.e., the bis(oxalato)borate salt), or it can include more than one salt. In some embodiments, the electrolyte includes, for example, two salts, three salts, or four salts. One or more of the salts can be, for example, a lithium salt.

In some embodiments, electrochemical cell 10 includes an electrolyte formed of a mixture of solvents having DME and PC, and a salt mixture of LiTFS and LiTFSI. The concentration of DME in the mixture of solvents can range from about 30 percent to about 85 percent by weight. The concentration of DME in the mixture of solvents can be equal to or greater than about 30 percent, 35 percent, 40 percent, 45 percent, 50 percent, 55 percent, 60 percent, 65 percent, 70 percent, 75 percent, or 80 percent by weight; and/or equal to or less than about 85 percent, 80 percent, 75 percent, 70 percent, 65 percent, 60 percent, 55 percent, 50 percent, 45 percent, 40 percent, or 35 percent by weight. The concentration of PC in the mixture of solvents can be equal to 100 percent minus the concentration of DME. For example, if the concentration of DME in the mixture of solvents is 75 percent by weight, then the concentration of PC in the mixture of solvents is 25 percent by weight. If the concentration of DME in the mixture of solvents is 50-75 percent by weight, then the concentration of PC in the mixture of solvents is 25-50 percent by weight.

For the LiTFS and LiTFSI salt mixture, the total concentration of salt in the mixture of solvents can range from about 0.4 M to about 1.2 M. The total concentration of LiTFS and LiTFSI in the mixture of solvents can be equal to or greater than about 0.40 M, 0.45 M, 0.50 M, 0.55 M, 0.60 M, 0.65 M, 0.70 M, 0.75 M, 0.80 M, 0.85 M, 0.90 M, 0.95 M, 1.00 M, 1.05 M, 1.10 M, or 1.15 M; and/or equal to or less than about 1.2 M, 1.15 M, 1.10 M, 1.05 M, 1.00 M, 0.95 M, 0.90 M, 0.85 M, 0.80 M, 0.75 M, 0.70 M, 0.65 M, 0.60 M, 0.55 M, 0.50 M, or 0.45 M. Of the total concentration of salt, the concentration of LiTFS in the mixture of solvents can be (in mole fraction) equal to or greater than five percent, ten percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, 90 percent, or 95 percent; and/or equal to or less than 100 percent, 95 percent, 90 percent, 85 percent, 80 percent, 75 percent, 70 percent, 65 percent, 60 percent, 55 percent, 50 percent, 45 percent, 40 percent, 35 percent, 30 percent, 25 percent, 20 percent, 15 percent, ten percent, or five percent. The concentration of LiTFSI in the mixture of solvents can be equal to 100 percent minus the concentration of LiTFS in the mixture of solvents. For example, if the total concentration of salt in the mixture of solvents is 0.5 M, and the LiTFS concentration (in mole fraction) in the mixture of solvents is 90 percent (i.e., 0.45 M), then the LiTFSI concentration in the electrolyte mixture is ten percent (i.e., 0.05 M). In embodiments, other types of salts can be added to the electrolyte.

Other materials can be added to the electrolyte mixture. For example, in certain embodiments, electrochemical cell 10 includes an electrolyte formed of a mixture of solvents including EC, DME and PC, and a salt mixture of LiTFS and LiTFSI. The concentration of EC in the mixture of solvents can be from about five percent to about 30 percent by weight. The concentration of EC in the mixture of solvents can be equal to or greater than five percent, ten percent, 15 percent, 20 percent, or 25 percent by weight; and/or equal to or less than 30 percent, 25 percent, 20 percent, 15 percent, or ten percent by weight. The concentration of DME in the mixture of solvents can range from about 30 percent to about 85 percent by weight. The concentration of DME in the mixture of solvents can be equal to or greater than 30 percent, 35 percent, 40 percent, 45 percent, 50 percent, 55 percent, 60 percent, 65 percent, 70 percent, 75 percent, or 80 percent by weight; and/or equal to or less than 85 percent, 80 percent, 75 percent, 70 percent, 65 percent, 60 percent, 55 percent, 50 percent, 45 percent, 40 percent, or 35 percent by weight. The concentration of PC in the mixture of solvents can be equal to 100 percent minus the concentration of EC and DME. For example, if the concentration of EC in the mixture of solvents is 15 percent by weight, and the concentration of DME in the mixture of solvents is 60 percent by weight, then the concentration of PC in the mixture of solvents is 25 percent by weight. Examples of an EC:DME:PC solvent mixture are 14:62:24 and 10:75:15 percent by weight.

The LiTFS and LiTFSI concentrations in the electrolyte, e.g., from about 0.4 M to about 1.2 M, can be generally similar to those described herein. In embodiments, other types of salts can be added to the electrolyte.

Cathode 16 includes an active cathode material, which is generally coated on the cathode current collector. The current collector can include aluminum (e.g., in the form of an aluminum foil), an aluminum alloy, titanium, or nickel. In some embodiments, the current collector can be a metal grid. The current collector generally has at least one dimension (e.g., a length, a width, and/or a diameter) that is greater than about 0.2 millimeter (e.g., greater than about 0.5 millimeter, greater than about one millimeter, greater than about 1.5 millimeters, greater than about two millimeters). The active material can be, e.g., a metal oxide, halide, or chalcogenide; alternatively, the active material can be sulfur, an organosulfur polymer, or a conducting polymer. Specific examples include $MnO_2$, cobalt oxides, manganese spinels, $V_2O_5$, $CoF_3$, molybdenum-based materials such as $MoS_2$ and $MoO_3$, $FeS_2$, $SOCl_2$, S, and $(C_6H_5N)_n$ and $(S_3N_2)_n$, where n is at least two. The active material can also be a carbon monofluoride. An example is a compound having the formula $CF_x$, where x is from 0.5 to one, or higher. The active material can be mixed with a conductive material such as carbon and a binder such as polytetrafluoroethylene (PTFE) or Kraton (available from Shell). An example of a cathode is one that includes aluminum foil coated with $MnO_2$. The cathode can be prepared as described in U.S. Pat. No. 4,279,972. Specific cathode materials are a function of, e.g., the type of cell (such as primary or secondary).

Anode 12 can include an active anode material, usually in the form of an alkali metal (e.g., lithium, sodium, potassium) or an alkaline earth metal (e.g., calcium, magnesium). The anode can include an alloy of an alkali metal (e.g., lithium) and an alkaline earth metal or an alloy of an alkali metal and aluminum. The anode can be used with or without a substrate. The anode also can include an active anode material and a binder. In this case an active anode material can include tin-based materials, carbon-based materials, such as carbon, graphite, an acetylenic mesophase carbon, coke, a metal oxide and/or a lithiated metal oxide. The binder can be, for example, PTFE. The active anode material and binder can be mixed to form a paste which can be applied to the substrate of anode 12. Specific anode materials are a function of, for example, the type of cell (such as primary or secondary).

Separator 20 can be formed of any of the standard separator materials used in electrochemical cells. For example, separator 20 can be formed of polypropylene (e.g., nonwoven polypropylene or microporous polypropylene), polyethylene, a polysulfone, or combinations thereof.

Case 22 can be made of a metal (e.g., aluminum, an aluminum alloy, nickel, nickel plated steel) or a plastic (e.g., polyvinyl chloride, polypropylene, polysulfone, ABS or a polyamide).

Positive lead 18 and/or cap 24 can be made of, for example, aluminum, nickel, titanium, or steel.

Electrochemical cell 10 generally includes at least two metal or metal alloy surfaces that are in electrical contact with each other. As an example, cathode 16 can include an aluminum current collector that is in electrical contact with positive lead 18, which can be made of steel. The two metal surfaces that are in electrical contact with each other can have the same composition (e.g., both surfaces can be made of the same metal or metal alloy (e.g., both surfaces are made of aluminum)), or can have different compositions (e.g., the two surfaces can be made of different metals or metal alloys (e.g., one surface is made of aluminum and the other surface is made of an alloy of aluminum)). A surface can have an interface between two portions having the same composition. The interface can have a different composition than the portions, e.g., due to wetting and diffusion.

While electrochemical cell 10 in FIG. 1 is a primary cell, in some embodiments a secondary cell can include one or more bis(oxalato)borate salts. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 3,451,24; and French Patent No. 1,646,81, all hereby incorporated by reference.

To assemble the cell, separator 20 can be cut into pieces of a similar size as anode 12 and cathode 16 and placed therebetween as shown in FIG. 1. Anode 12, cathode 16, and separator 20 are then placed within case 22, which is then filled with the electrolytic solution and sealed. One end of case 22 is closed with cap 24 and annular insulating gasket 26, which can provide a gas-tight and fluid-tight seal. Positive lead 18 connects cathode 16 to cap 24. Safety valve 28 is disposed in the inner side of cap 24 and is configured to decrease the pressure within electrochemical cell 10 when the pressure exceeds some predetermined value. Additional methods for assembling the cell are described in U.S. Pat. Nos. 4,279,972; 4,401,735; and 4,526,846.

Other configurations of electrochemical cell 10 can also be used, including, e.g., the coin cell configuration. The electrochemical cells can be of different voltages, e.g., 1.5 V, 3.0 V, or 4.0 V.

The invention is further described in the following examples, which do not limit the scope of the invention described in the claims.

EXAMPLE 1

Aluminum Corrosion at Different Voltages with Addition of lithium-bis(oxalato)borate Glass Cell Experimentation An electrochemical glass cell was constructed having an aluminum working electrode, a lithium reference electrode, and two lithium auxiliary electrodes. The aluminum working electrode was fabricated from a 99.995% aluminum rod inserted into a Teflon sleeve to provide a planar electrode area of 0.33 cm$^2$. The native oxide layer was removed by first polishing the planar working surface with 600 grit aluminum oxide paper under an argon atmosphere, and cleaned in acetone in an ultrasonic bath. Thereafter, the aluminum electrode was thoroughly rinsed in electrolyte. The electrode was then immediately transferred into a glovebox for use in a three-electrode glass cell. All experiments were performed under an argon atmosphere.

Cyclic Voltammetry

Corrosion current measurements were made according to a modified procedure generally described in X. Wang et al., *Electrochemica Acta*, vol. 45, pp. 2677-2684 (2000). The corrosion potential of aluminum was determined by continuous cyclic voltammetry. In each cycle, the potential was initially set to an open circuit potential, then anodically scanned from +2.7 V to +4.5 V and reversed to an open circuit potential. A scan rate of 50 mV/s was selected, at which good reproducibility of the corrosion potential of aluminum was obtained. The corrosion potential of aluminum was defined as the potential at which the anodic current density reached $10^{-5}$ A/cm$^2$ at the first cycle. The current was recorded as a function of voltage.

Chronoamperometry

Corrosion current measurements were made according to the procedure described in EP 0 852 072. The aluminum electrode was polarized at various potentials between 3.6 V and 4.5 V versus a lithium reference electrode while the current was recorded versus time. Current versus time measurements were taken over a 30-minute period. The area under the current versus time curve was used as a measure of the amount of aluminum corrosion occurring. The experiment also could be terminated in case the current density reached three mA/cm$^2$ before the 30-minute time period elapsed and no corrosion suppression occurred. Corrosion suppression occurred when the resulting current density was observed in the range of $10^{-6}$ A/cm$^2$.

Figure 2:
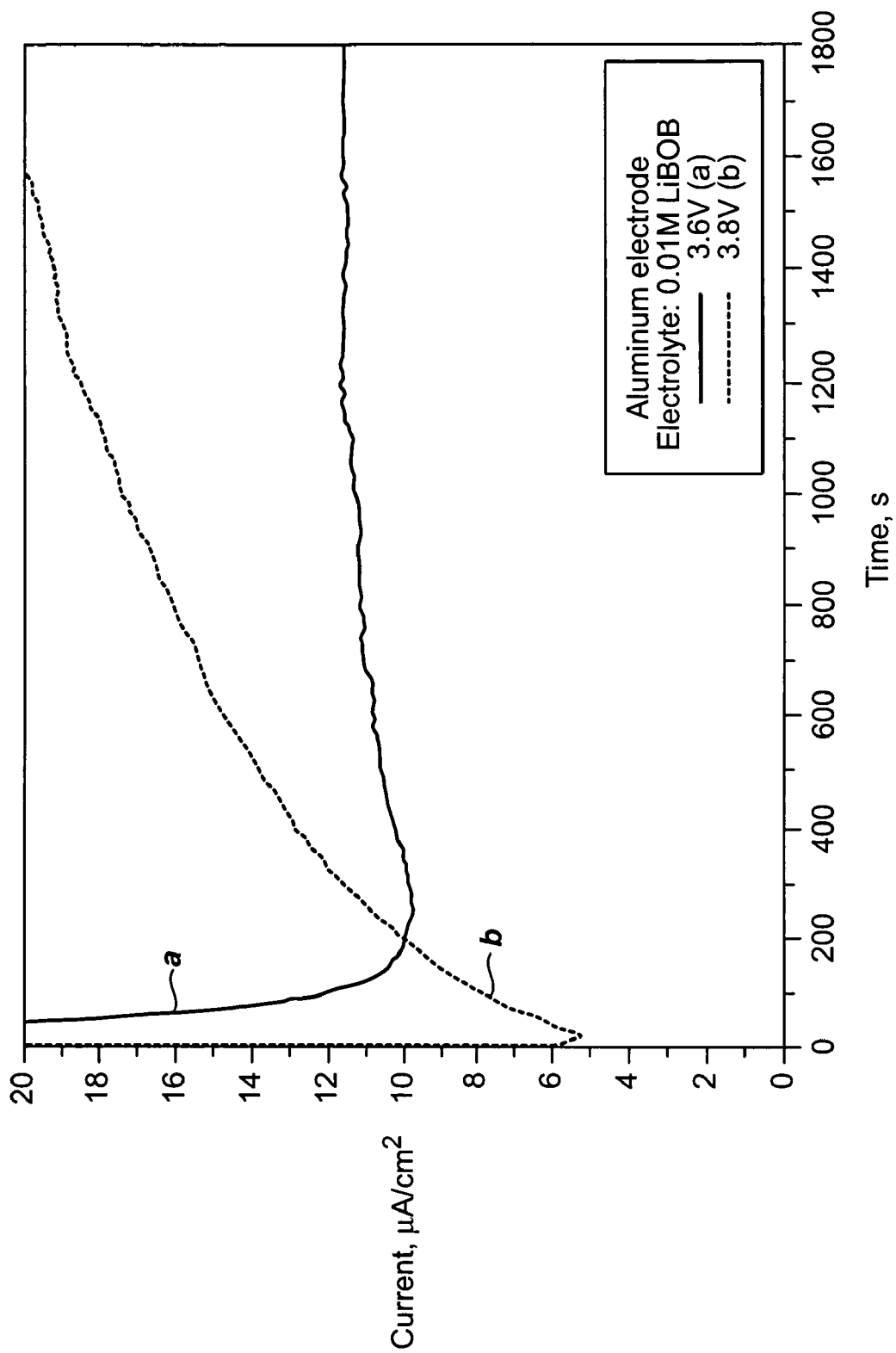
FIG. 2 is a graph showing current density versus time of aluminum electrodes at 3.6 V and at 3.8 V in an electrolyte containing 0.01 M lithium-bis(oxalato)borate.

Referring to FIG. 2, curves "a" and "b" show the potentiostatic dependence (chronoamperograms) of an aluminum electrode exposed at different voltages to an electrolyte containing 12.6% ethylene carbonate, 25.3% propylene carbonate, 62.1% dimethoxyethane, 0.64 M LiTFS, and 0.01 M lithium-bis(oxalato)borate. Curve "a" shows a chronoamperogram of the aluminum electrode at +3.6 V, while curve "b" shows a chronoamperogram of the aluminum electrode at +3.8 V. As shown in FIG. 2, at a lithium-bis(oxalato)borate concentration of 0.01 M, aluminum corrosion at +3.6 V (versus a lithium reference electrode) was effectively suppressed (i.e., the corrosion current at +3.6 V was around 10 μA/cm$^2$). Aluminum corrosion did take place, however, in the same concentration of lithium-bis(oxalato)borate (i.e., 0.01 M) at +3.8 V (versus a lithium reference electrode).

Figure 3:
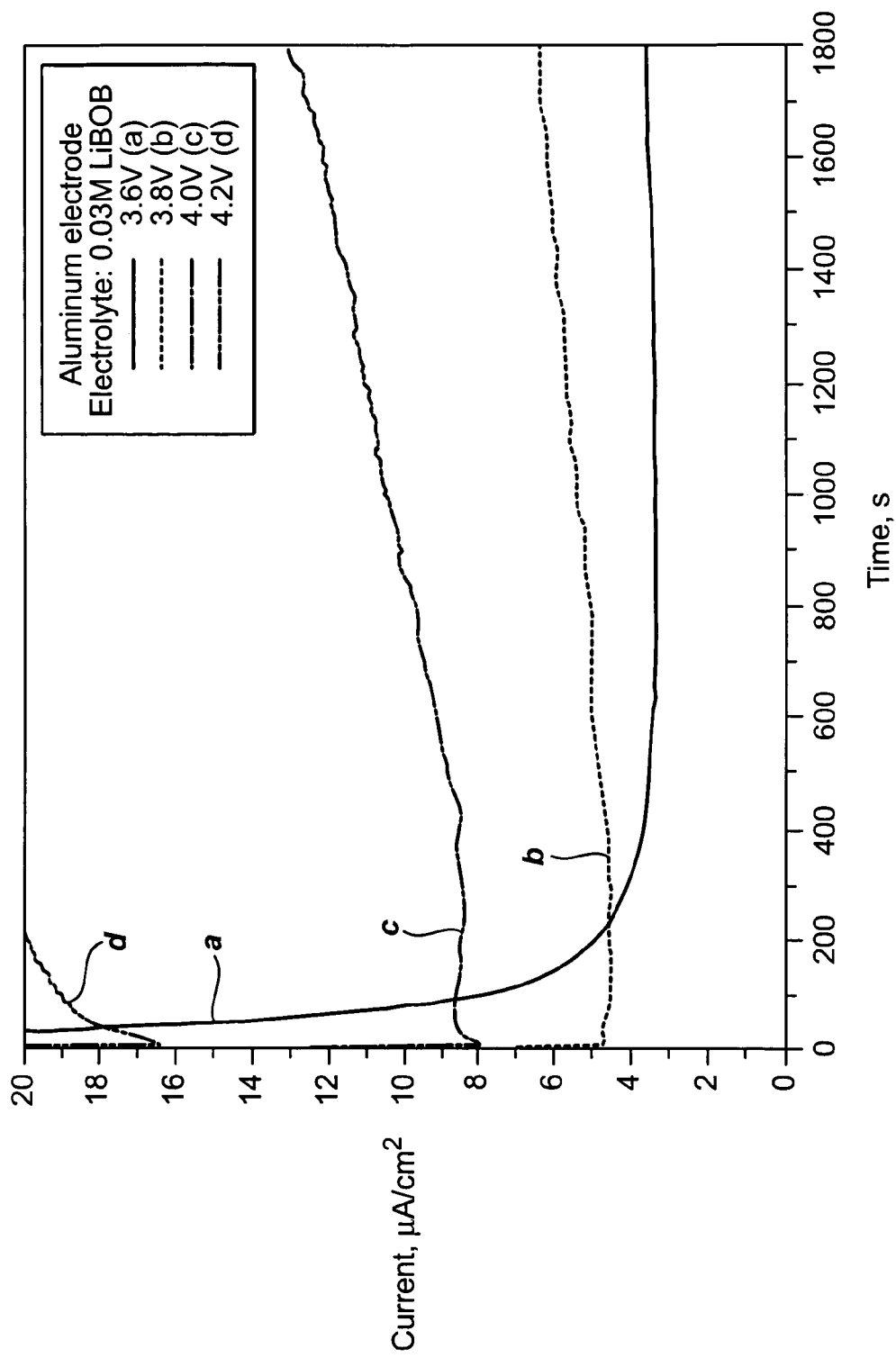
FIG. 3 is a graph showing current density versus time of aluminum electrodes at 3.6 V, 3.8 V, 4.0 V, and 4.2 V in an electrolyte containing 0.03 M lithium-bis(oxalato)borate.

Referring to FIG. 3, curves "a", "b", "c", and "d" show the potentiostatic dependence (chronoamperograms) of an aluminum electrode exposed at different voltages to an electrolyte containing 12.6% ethylene carbonate, 25.3% propylene carbonate, 62.1% dimethoxyethane, 0.64 M LiTFS, and 0.03 M lithium-bis(oxalato)borate. Curve "a" shows a chronoamperogram of the aluminum electrode at +3.6 V; curve "b" shows a chronoamperogram of the aluminum electrode at +3.8 V; curve "c" shows a chronoamperogram of the aluminum electrode at +4.0 V; and curve "d" shows a chronoamperogram of the aluminum electrode at +4.2 V. As shown in FIG. 3, at a lithium-bis(oxalato)borate concentration of 0.03 M, aluminum corrosion at +3.6 V (versus a lithium reference electrode) decreased to 3.5 μA/cm$^2$. Thus, the addition of more lithium-bis(oxalato)borate to the electrolyte helped to further suppress aluminum corrosion at +3.6 V.

Figure 4:
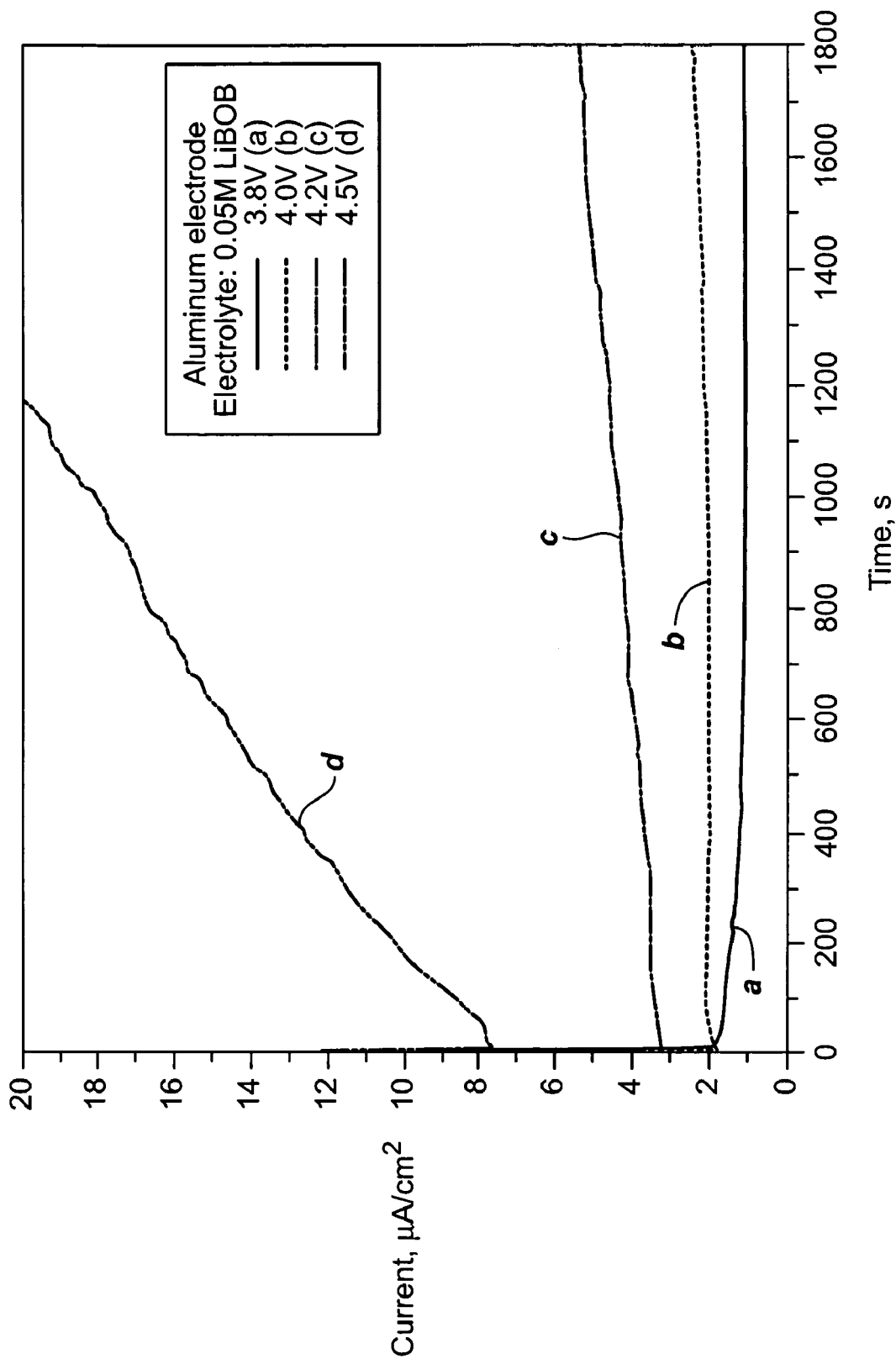
FIG. 4 is a graph showing current density versus time of aluminum electrodes at 3.8 V, 4.0 V, 4.2 V, and 4.5 V in an electrolyte containing 0.05 M lithium-bis(oxalato)borate.

Referring to FIG. 4, curves "a", "b", "c", and "d" show the potentiostatic dependence (chronoamperograms) of an aluminum electrode exposed at different voltages to an electrolyte containing 12.6% ethylene carbonate, 25.3% propylene carbonate, 62.1% dimethoxyethane, 0.64 M LiTFS, and 0.05 M lithium-bis(oxalato)borate. Curve "a" shows a chronoamperogram of the aluminum electrode at +3.8 V; curve "b" shows a chronoamperogram of the aluminum electrode at +4.0 V; curve "c" shows a chronoamperogram of the aluminum electrode at +4.2 V; and curve "d" shows a chronoamperogram of the aluminum electrode at +4.5 V. As shown in FIG. 4, at a lithium-bis(oxalato)borate concentration of 0.05 M, aluminum corrosion was effectively suppressed up to +4.0 V (versus a lithium reference electrode). With the addition to the electrolyte of lithium-bis(oxalato)borate at a concentration of 0.05 M, the corrosion current at +3.8 V and at +4.0 V was from about one μA/cm$^2$ to about two μA/cm$^2$. Thus, the addition of more lithium-bis(oxalato)borate to the electrolyte helped to further suppress aluminum corrosion at +3.8V and at +4.0 V.

Figure 5:
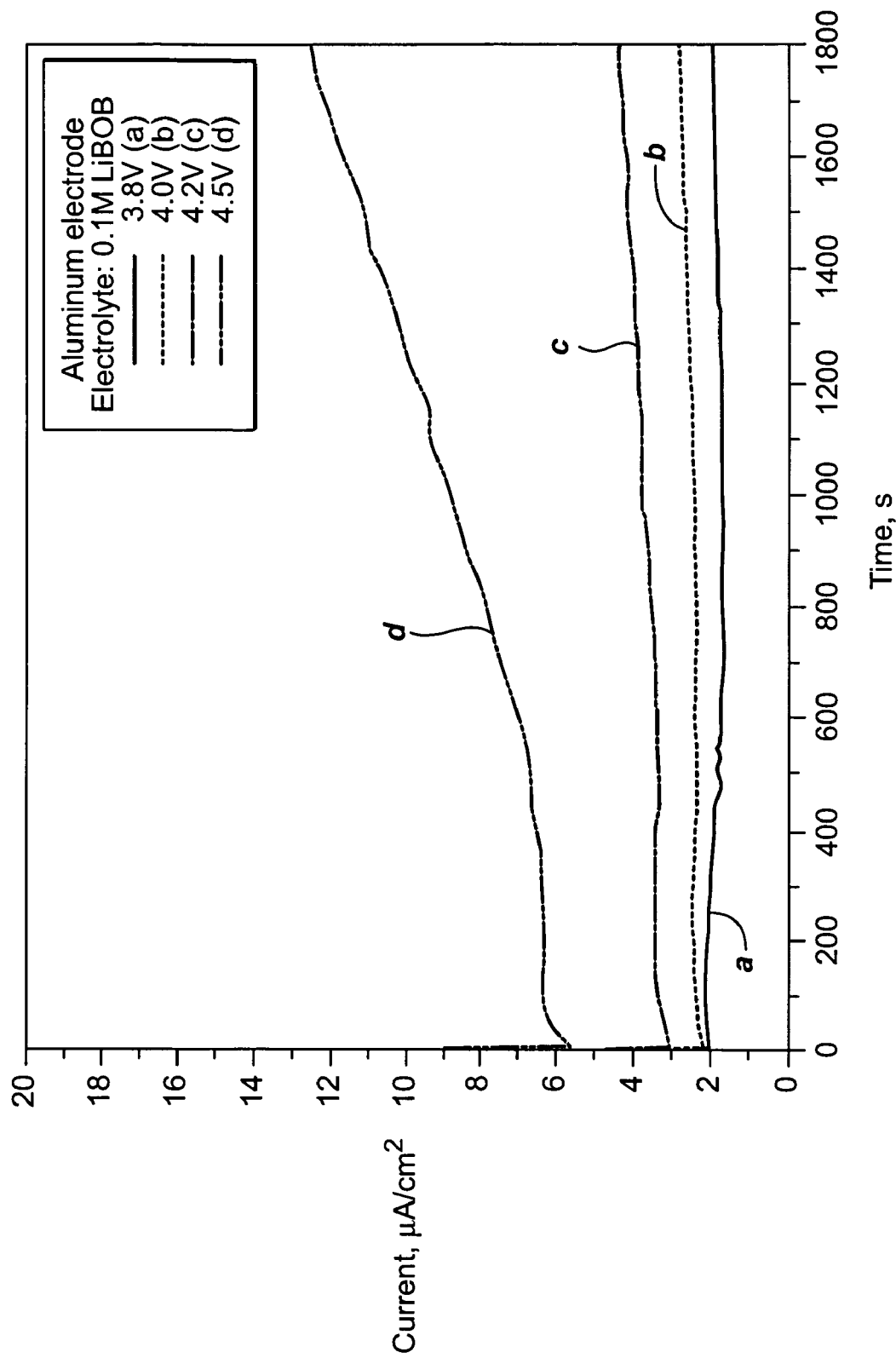
FIG. 5 is a graph showing current density versus time of aluminum electrodes at 3.8 V, 4.0 V, 4.2 V, and 4.5 V in an electrolyte containing 0.1 M lithium-bis(oxalato)borate.

Referring to FIG. 5, curves "a", "b", "c", and "d" show the potentiostatic dependence (chronoamperograms) of an aluminum electrode exposed at different voltages to an electrolyte containing 12.6% ethylene carbonate, 25.3% propylene carbonate, 62.1% dimethoxyethane, 0.64 M LiTFS, and 0.1 M lithium-bis(oxalato)borate. Curve "a" shows a chronoamperogram of the aluminum electrode at +3.8 V; curve "b" shows a chronoamperogram of the aluminum electrode at +4.0 V; curve "c" shows a chronoamperogram of the aluminum electrode at +4.2 V; and curve "d" shows a chronoamperogram of the aluminum electrode at +4.5 V. As shown in FIG. 5, at a lithium-bis(oxalato)borate concentration of 0.1 M, the aluminum electrode was stable in the electrolyte up to +4.2 V (versus a lithium reference electrode). With the addition to the electrolyte of lithium-bis(oxalato)borate at a concentration of 0.1 M, the corrosion current at +4.2 V was about 3.5 μA/cm$^2$. Thus, the addition of more lithium-bis(oxalato)borate to the electrolyte helped to further suppress aluminum corrosion at +4.2 V.

Figure 6:
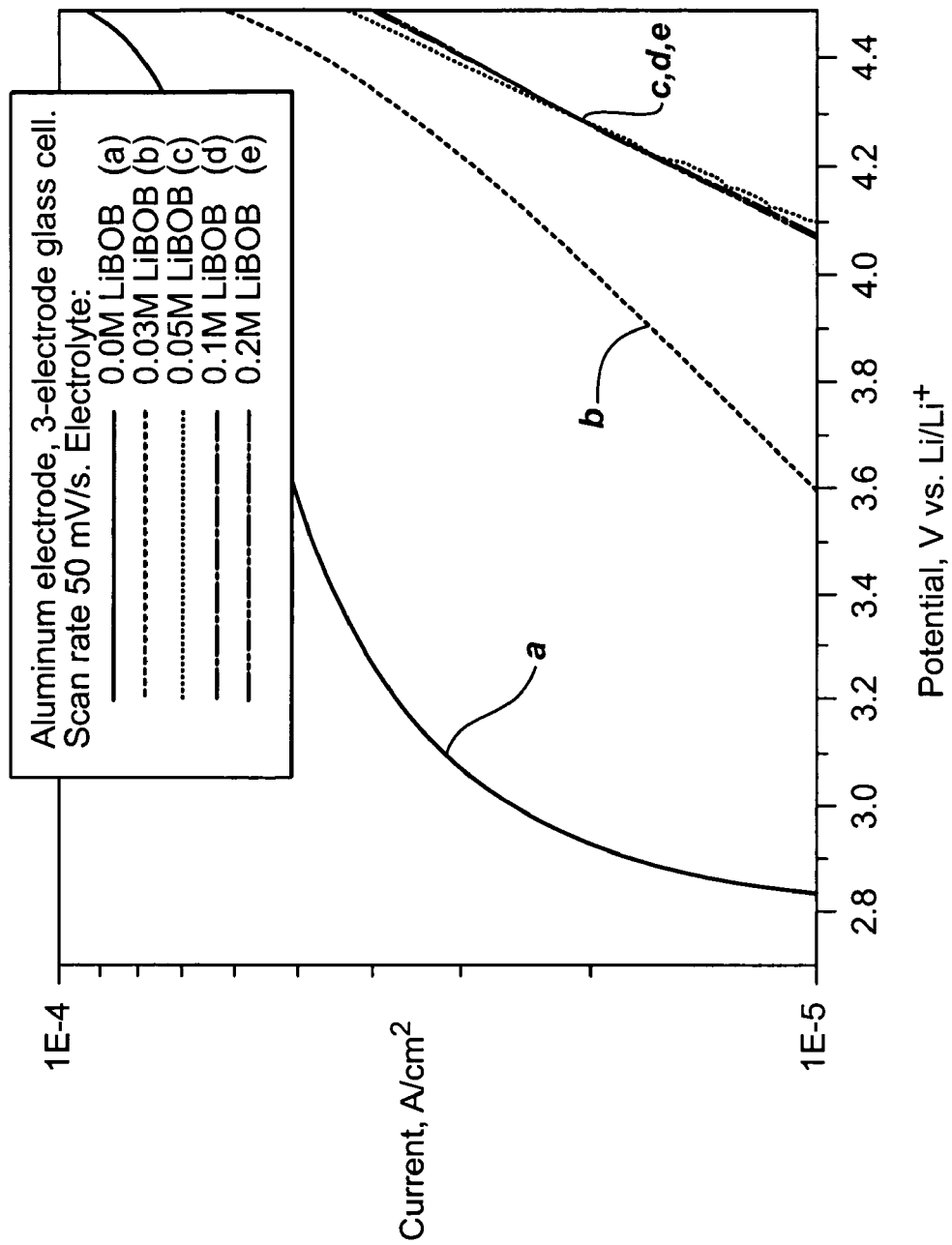
FIG. 6 is a graph showing current density versus potential of aluminum electrodes in electrolytes containing different concentrations (0.0 M, 0.03 M, 0.05 M, 0.1 M, and 0.2 M) of lithium-bis(oxalato)borate.

Referring to FIG. 6, cyclic voltammograms taken in the electrolyte containing 12.6% ethylene carbonate, 25.3% propylene carbonate, 62.1% dimethoxyethane, 0.64M LiTFS, and different concentrations of lithium-bis(oxalato)borate showed significant shifts in the corrosion potential of the aluminum electrode. The addition of lithium-bis(oxalato)borate to the electrolyte shifted the potential of aluminum in the positive direction, which indicates corrosion suppression. Curve "a" in FIG. 6 shows the corrosion potential of the aluminum in an electrolyte containing no lithium-bis(oxalato)borate. The addition of lithium-bis(oxalato)borate to the electrolyte at a concentration of 0.03 M shifted the corrosion potential of the aluminum about 800 mV in the positive direction (curve "b"). With the addition of lithium-bis(oxalato)borate to the electrolyte at concentrations of 0.05 M (curve "c"), 0.1 M (curve "d") and 0.2 M (curve "e"), the corrosion potential of the aluminum was shifted to around 4.1 V. These results demonstrate that the addition of increasing amounts of lithium-bis(oxalato)borate to the electrolyte containing 12.6% ethylene carbonate, 25.3% propylene carbonate, 62.1% dimethoxyethane, and 0.64 M LiTFS results in increasing degrees of corrosion protection of the aluminum electrode up to about 4.1 V.

All publications, patents, and patent applications referred to in this application are herein incorporated by reference to the same extent as if each individual publication, patent, or patent application was specifically and individually indicated to be incorporated by reference.

Other embodiments are possible. For example, although the examples described above relate to batteries, the invention can be used to suppress aluminum corrosion in systems other than batteries, in which an aluminum-metal couple occurs.

Other embodiments are within the claims.

What is claimed is:

1. A primary electrochemical cell comprising:
    a cathode containing MnO2;
    a cathode current collector comprising aluminum coupled to a positive lead including a metal selected from the group consisting of aluminum, titanium, and steel;
    an anode containing lithium; and
    an electrolyte containing a bis(oxalato)borate salt selected from the group consisting of metal bis(oxalato)borate salts and ammonium bis(oxalato)borate salts at a concentration of from 0.005 M to 0.1 M.

2. The electrochemical cell of claim 1, wherein the bis(oxalato)borate salt is lithium-bis(oxalato)borate.

3. The electrochemical cell of claim 1, wherein the electrolyte contains a second salt.

4. The electrochemical cell of claim 3, wherein the second salt comprises a lithium salt.

5. The electrochemical cell of claim 1, wherein the cathode lead comprises steel.

6. The electrochemical cell of claim 1, wherein the electrolyte contains the bis(oxalato)borate salt at a concentration of from 0.005 M to 0.05 M.

7. The electrochemical cell of claim 1, wherein the cathode current collector has an aluminum surface having at least one dimension greater than 0.5 millimeter.

8. The electrochemical cell of claim 1, wherein the aluminum surface has at least one dimension greater than one millimeter.

9. The electrochemical cell of claim 1, wherein the aluminum surface has at least one dimension greater than two millimeters.

10. An electrochemical cell comprising:
    a cathode containing an aluminum current collector;
    a positive lead including a metal selected from the group consisting of aluminum, titanium, and steel coupled to the aluminum current collector;
    an anode comprising lithium; and
    an electrolyte containing a bis(oxalato)borate salt selected from the group consisting of metal bis(oxalato)borate salts and ammonium bis(oxalato)borate salts at a concentration of from 0.005 M to 0.1 M and a second salt comprising a lithium salt, wherein the cell is a primary electrochemical cell.

11. The electrochemical cell of claim 10, wherein the bis(oxalato)borate salt is lithium-bis(oxalato)borate.

12. The electrochemical cell of claim 10, wherein the cathode contains $MnO_2$.

13. The electrochemical cell of claim 10, wherein the electrolyte contains the bis(oxalato)borate salt at a concentration of from 0.005 M to 0.05 M.

14. The electrochemical cell of claim 10, wherein the second salt comprises lithium trifluoromethanesulfonate.

15. The electrochemical cell of claim 10, wherein the electrolyte further comprises a third salt comprising a lithium salt.

16. The electrochemical cell of claim 15, wherein the third salt comprises lithium trifluoromethanesulfonate or lithium trifluoromethanesulfonimide.

17. The electrochemical cell of claim 10, wherein the cathode contains iron disulfide.

18. A primary electrochemical cell comprising:
    a cathode containing only MnO2 as an active cathode material and an aluminum current collector;
    a positive lead including a metal selected from the group consisting of aluminum, titanium, and steel coupled to the aluminum current collector;
    an anode containing lithium; and
    an electrolyte containing a bis(oxalato)borate salt selected from the group consisting of metal bis(oxalato)borate salts and ammonium bis(oxalato)borate salts at a concentration of from 0.005M to 0.1 M.

19. The electrochemical cell of claim 18, wherein the bis(oxalato)borate salt is lithium-bis(oxalato)borate.

* * * * *